United States Patent [19]

Haggerty et al.

[11] 3,935,344
[45] Jan. 27, 1976

[54] SIZING COMPOSITION AND GLASS FIBERS TREATED THEREWITH

[75] Inventors: William H. Haggerty, Reynoldsburg; Gerhard N. Bolen, Granville, both of Ohio

[73] Assignee: Owens-Corning Fiberglas Corporation, Toledo, Ohio

[22] Filed: July 17, 1972

[21] Appl. No.: 272,523

Related U.S. Application Data

[63] Continuation of Ser. No. 81,157, Oct. 15, 1970, abandoned.

[52] U.S. Cl. ............... 428/378; 428/417; 428/447; 428/474; 428/480; 428/484; 428/519; 428/401
[51] Int. Cl.² .......................................... D02G 3/00
[58] Field of Search. 117/126 GE, 126 GB, 161 ZB; 260/830 TW

[56] References Cited
UNITED STATES PATENTS

| | | | |
|---|---|---|---|
| 3,249,412 | 5/1966 | Kolek et al. | 65/3 |
| 3,454,515 | 7/1969 | Hathwar | 260/29.6 |
| 3,459,585 | 5/1969 | Killmeyer et al. | 117/126 GE |
| 3,652,326 | 3/1972 | Ward | 117/126 GE |

OTHER PUBLICATIONS

"Aircoflex 400 for Adhesives" Airco Chemical Company Bulletin.

*Primary Examiner*—George F. Lesmes
*Assistant Examiner*—William R. Dixon, Jr.
*Attorney, Agent, or Firm*—Carl G. Staelin; John W. Overman

[57] ABSTRACT

A sizing for glass fibers, comprising water dispersible epoxy resin, polyvinyl acetate copolymer, vinyl ethylene copolymer, an organosilane, wax, lubricant, and a fluid silicone emulsion is provided, whereby the sized fibers in the form of strands, possess excellent integrity and whiteness in color when incorporated into a resinous matrix.

6 Claims, No Drawings

SIZING COMPOSITION AND GLASS FIBERS TREATED THEREWITH

This is a continuation of application Ser. No. 81,157, filed Oct. 15, 1970, and now abandoned.

BACKGROUND OF THE INVENTION

This invention relates to glass structures such as glass fibers in which the surface characteristics of the galass structure have been modified to enable the glass fibers, in strand form, to be chopped without losing their integrity, while possessing other favorable characteristics. Some of the other favorable characteristics possessed by the chopped strands include: flowability of the chopped strands during processing, mixing, handling, conveying and molding within a resinous matrix; low bulk density; heat resistance; lightness of color; and the chopped strands import high impact strengths to resinous matrices due to a strong bonding relationship between the sized chopped strands and the resinous materials, whether thermoset or thermoplastic materials.

Difficulties in the establishment of a chopped glass strand that possesses integrity during processing, flowability during processing, lightness in color and which imparts high impact strengths to the resinous matrices are well known in the art.

From the time of formation of glass fibers to the more distant point in time of their incorporation into a resin matrix to reinforce the same, many processing operations will have had to be carried out. Immediately after the glass fibers are formed and traveling at linear speeds in excess of 10,000 feet per minute a protective coating is applied to the glass fibers to prevent mutual abrasion. Subsequently the sized fibers are gathered onto a rotating collection package or routed directly to a chopping apparatus where the glass strands are chopped into lengths ranging from about ⅛ to about 2 inches, or even longer lengths.

When the strands are gathered onto a package it is preferable to dry the package prior to positioning the package on a creel with numerous other packages, in order to form a roving which is collected on a roving doff. When the strands are fed directly to the chopper, the drying may be prior to or subsequent to chopping. When the strands are dried prior to being chopped a less integral strand results whereas when the strands are dried subsequent to chopping a highly integral strand results. Because of the differences in integrity the amount of solids of the sizing on the glass fibers may be adjusted accordingly to compensate therefor. Subsequent to chopping, the chopped strands may be either packaged for a later use or be combined and mixed with a resinous material to form a premix which is used as a molding compound. Finally the molding compound may be either packaged for subsequent use or may be immediately used in a molding operation to form reinforced articles.

The treatment applied to the glass fibers at forming must be multifunctional for the purposes of this invention. It must be capable of protecting the individual fibers from mutual abrasion especially when the fibers in the form of a strand, are combined to form a roving and the roving is subsequently wound onto a collection package. The treatment must also be capable of maintaining the glass strands making up the body of the roving in an integral unit before, during, and after chopping, so that during handling, conveying, mixing, and molding, the chopped strands have flowability and are further capable of a strong bonding relationship with a resinous matrix that is to be reinforced.

Difficulties in the establishment of a strong and permanent bonding relationship between the surfaces of glass fibers and a resinous material have in general become well known in the art. Because of the nonporous character of glass fibers, as distinguished from a high degree of porosity available in natural fibers such as the fibers of cellulose, wool, cotton, hemp and the like, penetration of resinous materials into the fibers is not available for use in establishing a bonding relationship between such glass fibers in a resinous material. Because glass fibers naturally form into elongate rods having very smooth surfaces, as distinguished from the rough surface characteristics of natural fibers, a gripping relationship or a mechanical bonding is difficult to establish between resinous materials and the untreated glass fiber surfaces. Thus a physical anchorage of the type relied upon chiefly for the establishment of a bonding relationship between natural fibers and resinous materials is not capable of being developed with glass fibers. Glass fibers may be etched or roughened to present a surface of some porosity but desirable strength characteristics of the glass surfaces are simultaneously lost.

In the absence of the ability to make use of physical forces in bonding, it becomes necessary to rely upon the development of a relationship requiring chemical bonding or physical-chemical forces based upon molecular or ionic attraction and the like. With synthetic resinous fibers e.g. nylon, polyester, etc. a strong bonding relationship can be developed with the smooth surfaces because such fibrous materials are resinophilic in character and therefore preferentially receptive to resinous treating materials. In addition, the resinous materials, of which the fibers are formed, have the ability of being softened by heat or solvent in a manner to enable the development of a desired bonding relationship with the applied treating material. Such chemical forces resulting from the softening of the synthetic fiber surfaces are not available with glass fibers because the glass fibers are inert to heat solvents and because the glass fiber surfaces are dominated by groups that are hydrophilic in character and therefore receive moisture in preference to resinous materials. As as result, only a weak bonding relationship is capable of being established in the first instance and even this limited bonding is reduced in the presence of moisture or high humidity sufficient to cause a moisture film to form and separate the resinous coating from the glass fiber surfaces with a moisture interface.

When a strong bonding relationship cannot be established between glass fibers and a resinous material used in combination therewith, maximum utilization of the strength properties of the glass fibers connott be made available in the products that are formed. Even where a fair bonding relationship between glass and resin can be established under extremely dry conditions, the strength properties of the glass fiber reinforced plastic composite depreciates greatly under high humidity conditions or in the presence of moisture.

When glass fibers are formed into strands, containing many fibers, and the strands are subsequently chopped into lengths of preferably from about ⅛ inch to about 1 inch it is desirable to have the chopped strands possess integrity. That is, after chopping it is desired to have a strand in a rod-like manner without the many fibers making up the strand separating from the rod-like structure. The desirability of this rod-like structure is important when a resinous matrix is to be reinforced with glass fibers to improve strength and other characteristics. Another desirable characteristic of the chopped strands of this invention is that they have a high degree of flowability during processing, especially within the resinous matrix that is to be reinforced so that the chopped strands have a uniform dispersement within the matrix and not be heavily grouped in one local concentration and void of chopped strand in another concentration. Still another desirable characteristic of the chopped strands of this invention is that they possess a high degree and uniform quality of whiteness, so that when the strands are incorporated into a resinous matrix, there is substantially no fiber prominence, i.e. it is difficult to determine visually and physically, such as by touch, that the resinous matrix is reinforced with glass fibers.

Difficulties in the establishment of a reinforced article having little or no fiber prominence have in general become well known in the art. Fiber prominence may be attributed to discoloration of the treatment on the fiber when compared to the color of the resin matrix that is reinforced and may also be attributed to the physical surfacing of the fiber to the resin surface. Fiber prominence is an undesirable characteristic in reinforced articles especially glass reinforced articles. It is thought that the discoloration of the fibers occurs during the curing of the reinforced article. Many reinforced articles do not have pigment coloration therein and for this reason, in the past, undesirable fiber prominence characteristics have been a problem.

It is therefore an object of this invention to produce a treatment for glass fibers and to produce glass fibers treated with a material to enable the glass fibers, in strand form to be formed into a roving and subsequently chopped wherein the chopped strands maintain integrity during further processing.

It is another object of the invention to provide a new and improved coating for glass fibers so that the coated fibers when gathered into a strand, chopped, and subsequently used as a chopped reinforcement in resinous matrices, remain flexible and substantially insoluble in the matrices.

It is yet another object to produce glass fibers, which when incorporated with a resinous matrix, exhibits substantially no fiber prominence within the matrix.

It is yet another object to produce glass fibers, which when chopped, possess good flowability characteristics during processing.

It is still another object to produce glass fibers, which when incorporated in a resinous matrix, exhibits a strong bonding relationship with the matrix.

Further objects and advantages of the invention will become apparent to those skilled in the art to which the invention relates from the following description.

Processability of the glass strands becomes extremely important during the introduction of the treated strands to the chopper. It is desirable to obtain chopped strands of uniform length, but this becomes difficult when the chopper becomes clogged with previously chopped fibers. Static forces are set up on chopping and must be combated.

A lack of strand integrity during processing is more than a problem. It is detrimental to the uniform distribution of chopped strands within a resinous matrix because the strands conglomerate or clump together. When a thermosetting matrix is to be reinforced, a premix, comprising the chopped strands in the resin, is formed. When a thermoplastic matrix is to be reinforced, the chopped strands and resin are introduced into an injection molding machine as a dried blend via vibration. If filamentation of the chopped strands occurs, the strands will tend to stick together through physical forces or static forces, and cause a non-uniform distribution of the strands into the matirx, or a non-uniform distribution of the strands into the injection molding machine.

The degree of integrity possessed by the chopped strands becomes extremely important when the strands are incorporated with a resinous matrix. During the incorporation it is desirable to obtain some filamentation of the strand sufficient to increase the surface area of available reinforcement, but insufficient to be incapable of actual reinforcement. It has been found that when the strands have no degree of filamentation upon incorporation with a resinous material, strengths of the composite are low. The same phenomenon is present when there is no integrity of the chopped strand after incorporation of the strand with the resinous matrix. Therefore, a compromise between a highly integrated strand and a highly filamentized strand must be reached.

Chemical as well as physical forces contribute to the degree of filamentation of the treated strand, after incorporation into a resinous matrix.

The inventive treatment, hereinafter described in greater detail provides all of the advantages as above described.

SUMMARY OF THE INVENTION

According to the present invention it has been discovered that impact strengths of resinous matrices reinforced by short lengths of glass fibers are greatly increased if the short length of fibers are in the form of a strand having some degree of filamentation, rather than dispersed throughout the resin as individual filaments or small groups of filaments. The inventive treatment which bonds the fibers together into a strand is of low or intermediate molecular weight, so that it is flexible, but is cross-linked to a relatively insoluble degree and capable of holding the fibers together in the form of a strand during processing. Residual reactivity of the treatment provides a controlled bonding between the treatment on the strands and the matrix resin.

According to the invention the film formers within the treatment are capable of partial reaction during the fiber forming operation to form an integral strand and they are capable of further reaction when incorporated in a resinous matrix, to provide a controlled degree of attachment between the surface of the fibers and the matrix resin. The coating on the fibers is generally immobile or in a solid state, and the degree of bonding which is achieved between the strand coating and the matrix resin is a limited or controlled one, which allows the bond between the strand and the matrix resin to yield under a concentrated load, such as occurs during impact. Concentrated loads cause some of these bonds to be broken to allow the strand to move. It appears that some degree of filamentation of the treated strand is necessary upon incorporation of the strand with the resin matrix so that a synergistic system is developed.

In a preferred form of the invention, a plurality of individual glass fibers are coated at forming with a water dispersion comprising a low or intermediate molecular weight polyvinyl acetate copolymer, vinyl ethylene copolymer, a water soluble epoxy resin, wax, lubricant, fluid silicone emulsion, and an organosilane. After the individual fibers are coated with the dispersion, they are gathered together into a strand and collected on a package and dried at a temperature which causes the coating to set up sufficiently, so that it is flexible but substantially insoluble in a solution of matrix resin. The matrix resin may be a styrene solution of a cross-linking polyester resin, or may be an organic solution of some other unsaturate such as polypropylene, polyethylene, or polystyrene. When the coated strand is mixed with the matrix resin and the composite or laminate is heated at a temperature above the drying temperature employed at forming, a polymerization of the matrix resin is produced, and a limited number of bonds are formed between the surface of the strand coating and the matrix resin. The coated strands remain white and do not discolor, thereby substantially eliminating fiber prominence. The limited number of bonds between the solid coating material and the matrix resin becomes sequentially broken when subjected to concentrated loads, to allow a yielding of the matrix resin relative to the strand, and a consequent redistribution of the load over a number of strands. In addition, the coated strands are "locked" into the resin matrix mechanically upon polymerization of the resin matrix. A considerable improvement in impact strength is thereby produced.

DESCRIPTION OF THE PREFERRED EMBODIMENTS

EXAMPLE I

A sizing composition comprising an aqueous dispersion of the following materials is prepared as follows:

| Material | Percent by Weight |
| --- | --- |
| Water soluble epoxy | 1.50 |
| Polyvinyl acetate, N-methylolacrylamide copolymer | 3.85 |
| Vinyl acetate ethylene copolymer emulsified particles stabilized with acetylated polyvinyl alcohol | 3.85 |
| Gamma-methacryloxypropyltrimethoxysilane | 0.10 |
| Glacial acetic acid | 0.30 |
| Wax | 0.10 |
| Lubricant | 0.30 |
| Paintable fluid silicone emulsion | 0.50 |
| Deionized water | Balance |

The pH of the sizing composition ranges from about 4.0 to about 5.0. The solids of the composition ranges from approximately 6.0 to 7.0 and the solids on the coated strand are approximately 1.0 to 2.0 percent.

EXAMPLE II

An aqueous dispersion is made of the following materials:

| Material | Percent by Weight |
| --- | --- |
| Water soluble epoxy | 0.5 – 3.0 |
| Polyvinyl acetate, N-methylolacrylamide copolymer | 2.0 – 5.0 |
| Vinyl acetate ethylene copolymer emulsified particles stabilized with acetylated polyvinyl alcohol | 2.0 – 5.0 |
| Gamma-methacryloxypropyltrimethoxysilane | 0.01– 5.0 |
| Glacial acetic acid | 0.1 – 1.0 |
| Wax | 0.1 – 1.5 |
| Lubricant | 0.1 – 1.5 |
| Paintable fluid silicone emulsion | 0.1 – 5.0 |
| Deionized water | Balance |

The pH of the dispersion ranges from about 4.0 to about 5.0. The solids of the dispersion falls within a range of from 6.0 to 7.0 and the solids on the coated strand range from approximately 1.0 to 2.0 percent. The materials were mixed together by combining acetic acid with the water soluble epoxy, and mixing thoroughly. To dissolve the water soluble epoxy-acetic acid mixture, cool deionized water (60° to 80°F.) was slowly added to the mixture with thorough and vigorous agitation. The resin thickened upon the addition of water. This resin mixture inverts similarly to resin emulsions, therefore the inversion point is approached slowly. Upon inversion, an additional gallon of water is added, and agitated for approximately 10 minutes and further diluted with approximately 40 gallons of unheated water. Subsequently the polyvinyl acetate copolymer and the vinyl ethylene copolymer are added to the mix. Separately, a silane premix is prepared by metering approximately 20 gallons of cool deionized water into a premix kettle with the agitator turned on, and approximately half of the acetic acid requirement is added thereto. The organosilane is slowly added to the turbulent water. This premix is agitated for approximately 10 minutes and checked for clarity. Subsequently this silane premix is added to the above mixture along with the wax and lubricant and paintable silicone emulsion. Additional water is added to bring the mixture to the desired solids of from about 4.0 to 8.0.

The water soluble epoxy hereinabove mentioned is prepared by dissolving approximately 805 parts by weight of the general type of epoxide indicated by the following structure having an $n$ of about 3.6,

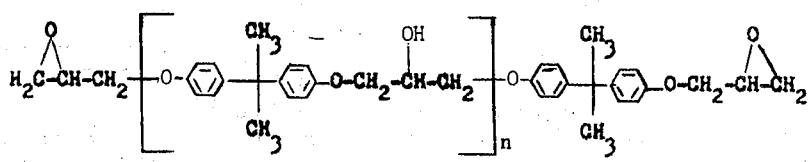

with 345 parts by weight of xylene in a 2 liter Kimax reactor kettle having a motor driven agitator therein and surrounded by a Glas Col heated mantle controlled by a Variac. The vessel is suitably closed off, and is provided with a reflux condenser to prevent the escape of solvents and/or reactants. The mixture is heated to 105°C. with stirring to thoroughly dissolve the resin and thereafter the temperature is raised to 120°C. and approximately 65 parts by weight diethanol amine is added slowly with continuous mixing. The products are held at approximately 120°C. for approximately 1 hour to provide ample time to react all of the amine. The material produced by the above reaction is essentially that as follows, and contains a preponderance of molecules having a single terminal solubilizing group at one end.

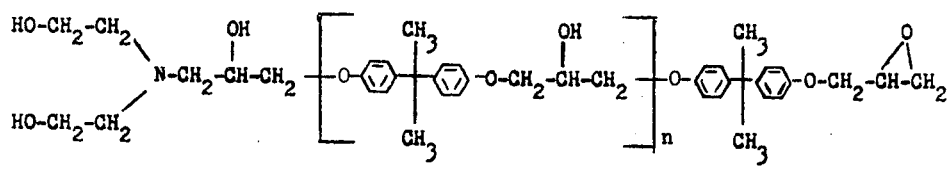

Thereafter a polyglycol monoester, such as polyglycol monooleate, is added and reacted with the remaining oxirane groups. Approximately 400 parts by weight of a commercially available polyethylene glycol monooleate having a molecular weight of about 400 is added to the reaction kettle using about 2.5 parts by weight of a basic catalyst (as for example potassium carbonate), and the mixture heated to maintain 120°C. for 4 hours. The resulting material has an epoxy equivalent of 3,000, indicating one epoxy equivalent for 3,000 grams of the material. The material produced by the above reaction is shown by the following formula showing the preponderance of molecules that have terminal solubilizing groups at both ends of the molecule:

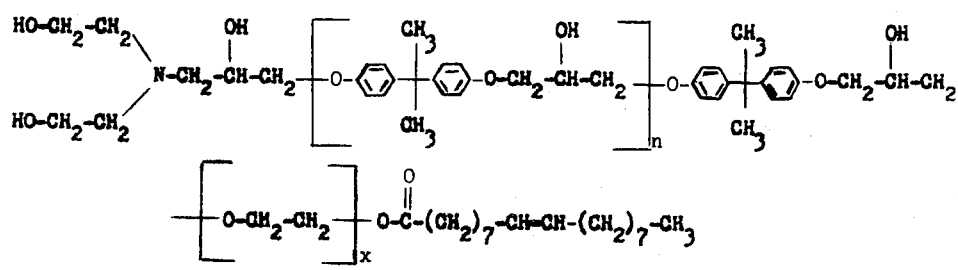

wherein $x = 8$ to $10$.

The polyvinyl acetate copolymer is N-methylol acrylamide copolymer emulsion and it is commercially available under the designation 25-2828 from National Starch Company. The vinyl ethylene copolymer is an emulsion that is miscible with water in all proportions and it is commercially available under the designation AIRCOFLEX 400 from Airco Chemicals and Plastics Company. AIRCOFLEX 400 is an emulsion of ethylene-vinylacetate copolymer particles which are stabilized by a partially acetylated polyvinyl alcohol protective colloid. The polyvinyl alcohol is partially acetylated by polymerizing vinyl acetate with vinyl alcohol. The wax is a polymer of polyethylene glycol with an average molecular weight of 950 to 1050 and it is commercially available under the designation CARBOWAX 1000 from Union Carbide Corporation. The lubricant is a slightly anionic blended product, containing an amide/ester antistat, non-ionic emulsifier, and mineral oil, commercially available under the designation TWITCHELL 7440 from Emery Industries, Inc. The paintable silicone fluid emulsion is commercially available under the designation SM 2050 from General Electric Company.

816 continuous filament glass fibers of approximately 0.00035 to 0.00055 inches in diameter were produced by attenuating molten streams of glass at a rate of approximately 10,000 feet per minute. The glass fibers, immediately after solidification, were pulled over a graphite applicator that was flooded with the aqueous dispersion given above. The coated fibers were brought together into a strand by a gathering device, and the strand was then wound on a rotating drum mounted on a revolving spindle which pulled the fibers at a rate of approximately 10,000 feet per minute. A suitable traverse mechanism moved the strand back and forth across the drum to produce a coiled package approximately 12 inches wide, with an inside diameter of approximately 8 inches, an outside diameter of approximately 12 inches, and tapered sides. The package was removed from the spindle and dried in an oven at a temperature of about 265°F. Thereafter the strand was unwound from the package combined with a plurality of strands from other packages to form a roving. The roving was then gathered onto a package for subsequent use. Alternately, the strands from the packages may be fed directly to a chopping machine and chopped into uniform short lengths.

According to the invention, glass fibers, used as a reinforcement in a sheet molding compound, when coated with the above-described dispersion of Examples I and II, demonstrated excellent properties when a laminate formed therefrom was compared against competitive laminates. Following is a table showing the comparison.

TABLE

| Laminate Identity | LAMINATE APPEARANCE RATING | | | Overall Rating |
|---|---|---|---|---|
| | Fiber Prominence | Visual | Micro-Inch | |
| A | 1 | 1 | 128 | 1 |
| B | 2 | 2 | 200 | 2 |
| C | 4 | 4 | 221 | 4 |
| D | 2 | 1 | 134 | 1.5 |

Fiber prominence as used for the comparison is defined as the intensity or conspicuousness of the strand in the resin matrix. The rating of the laminates is as follows: 1.0 — excellent, 2.0 — good, 3.0 — fair and 4.0 — poor.

To further explain the ratings in the above table, the laminates reinforced with glass fibers having the inventive treatment thereon show substantially no fiber prominence and were of uniform color, whereas laminates reinforced with glass fibers having competitive treatments thereon show a good deal of fiber prominence, i.e. the reinforcement appeared brown in color within a white resinous matrix.

All of the laminates contained 30 percent by weight of glass fibers. Laminate A had the inventive treatment thereon, whereas laminates B, C and D had competitive treatments thereon.

A sheet molding compound is formed in a continuous manner by applying a layer of a resin-filler mixture or paste that contains a curing catalyst onto the surface of sheet material, as for example a polyethylene film. Glass fibers, preferably in uniformly chopped lengths, which have previously been treated with the aqueous dispersion of Example I and Example II, are laid on top of the layer of resin-filler paste, and another layer of resin-filler paste containing the catalyst is deposited over the glass fibers. Thereafter, a second layer of sheet material, as for example a polyethylene film is positioned against the second applied layer of resin-filler paste, and the composite sandwich is compressed together preferably by means of a pair of rolls. The rolling action forces the resin-filler paste through the layer of fibers in a manner squeezing out most of the air entrained by the fibers. Therafter a plurality of needle-like members are forced through at least one layer of the sheet material downwardly through the resin-filler paste into the layer of fibers to form openings for the removal of entrapped air. Further compaction of the composite squeezes out the entrapped air and causes the resin-filler paste to fill in the openings formed by the needle-like members.

Also in the preferred embodiments, an alkaline earth metal oxide and/or hydroxide and a curing agent are incorporated into the mixture forming the resin-filler paste. The alkaline earth metal oxide produces a gelling action of the resin-filler paste without the application of heat. The polyethylene sheets allow the composite sandwich to be handled or coiled into a roll without sticking together. This sandwich later hardens into a pliable nontacky state upon aging. The layers of polyethylene can be removed from the aged glass fiber containing sheet of molding compound, and the sheet of molding compound can thereafter be physically handled in conventional molding operations using heat and pressure to form the finished molded article.

The process for forming a sheet molding compound and the sheet molding compound are more fully described in application Ser. No. 741,677, filed July 1, 1968 now abandoned.

The resin-filler paste which forms the matrix of a sheet molding compound is made of the following materials:

| Materials | Desirable % by Weight | Preferred % by Weight |
| --- | --- | --- |
| RESIN HAVING CROSSLINKABLE OLEFINIC DOUBLE BONDS | 25 – 95 | |
| 1 mol phthalic anhydride, 1 mol maleic anhydride, 2 mols propylene glycol cooked to an acid number of 30-35 | | 42.7 |
| CATALYST FOR CROSSLINKING DOUBLE BONDS | 0.1 – 5 | |
| Dicumyl peroxide | | 0.85 |
| 2, 5-dimethyl hexyl-2,5-di (peroxybenzoate) | | 0.09 |
| MOLD RELEASE AGENT | 0 – 5 | |
| Zinc Stearate | | 1.71 |
| CELLING AGENT (Alkaline Earth Metal Oxide) | 0.2 – 10 | |

| Materials | Desirable % by Weight | Preferred % by Weight |
| --- | --- | --- |
| Ca(OH)$_2$ | | 1.28 |
| SOLVENT | Optional | |
| Styrene Monomer | | 4.27 |
| FILLERS | 0 –75 | |
| Resin type (microethylene) | | 6.4 |
| Nonresinous filler (CaCO$_3$) | | 43.7 |

The resin-filler paste is prepared by charging the resin to a Cowles type mixture. The 2,5-dimethyl hexyl-2,5-di (peroxybenzoate) dissolved in approximately half of the styrene is blended with the resin. Thereafter, the dicumyl peroxide and mold release agent are added. The resin type filler is then blended in, following which the nonresinous filler is likewise added and thoroughly dispersed. Immediately before the resin-filler paste is to be used in making the sheet molding compound, a slurry of the gelling agent in the other half of the styrene is added and mixed for approximately 3 minutes.

The sandwich thus made is stored for 2 to 7 days at room temperature, during which time the alkaline earth oxide reacts with acid anhydride radicals of the resin to gel the resin and convert it into a handleable sheet. This sheet is prepared for molding by cutting sections for the roll, which sections contain the desired amount of material. The polyethylene sheets are stripped therefrom and the molding compound is placed into the cavity of matched dies. The matched dies are brought together to cause the molding compound to be displaced throughout the cavity, and the compound is cured in the cavity at a temperature of approximately 300°F. for 1 to 2 minutes. A completely acceptable glass fiber reinforced molded article is thus produced in which the molding compound is firmly bonded to the glass fibers.

Another resin-filler paste which forms the matrix of a sheet molding compound is made of the following materials:

| Materials | Desirable % by Weight | Preferred % by Weight |
| --- | --- | --- |
| Propylene maleate unsaturated polyester resin | 10 – 70 | 25.8 |
| Methylmethacrylate copolymer dissolved in styrene | 0 – 70 | 17.1 |
| Calcium carbonate filler (1) | 0 – 70 | 10.9 |
| Calcium carbonate filler (2) | 0 – 70 | 43.5 |
| Tertiary butyl perbenzoate | 0.25 – 1.0 | 0.42 |
| Zinc stearate | 0.25 – 3.0 | 0.99 |
| Magnesium hydroxide | 0.40 – 3.0 | 1.29 |

The propylene maleate unsaturated polyester resin is commercially available under the trade designation, "P-340" from the Rohm-Haas Company. The methylmethacrylate copolymer dissolved in styrene is commercially available under the trade designation, "P-681" from the Rohm-Hass Company. The calcium carbonate filler (1) and filler (2) are commercially available under the trade designation "Suspenso" and "Camelwite" respectively.

When glass fibers, treated in accordance with the inventive concept, are incorporated, preferably in chopped form, into the above sheet molding composition, substantially no fiber prominence, either visual or physical is present. Furthermore, the treated glass fibers do not disturb the low sink (profile) or low shrinkage characteristics of the sheet molding compound. In fact, the low shrink sheet molding compound above-described, when containing glass fibers treated with the inventive composition, exhibits the best overall properties, especially low shrinkage so that no depressions are discernable over ribbed sections used to further strengthen laminates as compared to glass fibers treated with known conventional sizings or compositions.

We claim:

1. Glass fiber strands having from approximately 1 to 2 percent by weight of a dried coating of a sizing composition comprising in percent by weight:

| Materials | % by Weight |
| --- | --- |
| Water soluble resin mixture given below | 1.50 |
| Vinyl acetate, N-methylol-acrylamide copolymer emulsion | 3.85 |
| Ethylene-vinyl acetate copolymer emulsified particles stabilized by a partially acetylated polyvinyl alcohol protective colloid | 3.85 |
| Gamma-methacryloxypropyl-trimethoxysilane | 0.10 |
| Glacial acetic acid | 0.30 |
| Wax | 0.10 |
| Lubricant | 0.30 |
| Paintable fluid silicone emulsion | 0.50 |
| Deionized water | Balance | said water soluble resin mixture being the reaction product of 1 mol of a diepoxy with 1 mol of diethanolamine and 1 mol of a polyglycol monoester with the preponderance of the diepoxy molecules having one diethanolamine molecule reacted with one oxirane group thereof and one polyglycol monoester molecule reacted with the other oxirane group thereof.

2. The glass fiber strands as claimed in claim 1, wherein the strands are of a length of from about ⅛ inch to about 2 inches.

3. The glass fiber strands as claimed in claim 1, wherein the strands are in the form of a roving.

4. Glass fiber strands having from approximately 1 to 2 percent by weight of a dried coating of a sizing composition comprising in percent by weight:

| Materials | % By Weight |
| --- | --- |
| Water soluble resin mixture given below | 0.5 – 3.0 |
| Vinyl acetate, N-methylol-acrylamide copolymer emulsion | 2.0 – 5.0 |
| Ethylene-vinyl acetate copolymer emulsified particles stabilized by a partially acetylated polyvinyl alcohol protective colloid | 2.0 – 5.0 |
| Gamma-methacryloxypropyl-trimethoxysilane | .01 – 5.0 |
| Glacial acetic acid | 0.1 – 1.0 |
| Wax | 0.1 – 1.5 |
| Lubricant | 0.1 – 1.5 |
| Paintable fluid silicone emulsion | 0.1 – 5.0 |
| Deionized water | Balance | said water soluble resin mixture being the reaction product of 1 mol of a diepoxy with 1 mol of diethanolamine and 1 mol of a polyglycol monoester with the preponderance of the diepoxy molecules having one diethanolamine molecule reacted with one oxirane group thereof and one polyglycol monoester molecule reacted with the other oxirane group thereof.

5. The glass fiber strands as claimed in claim 4, wherein the strands are of a length of from about ⅛ inch to about 2 inches.

6. The glass fiber strands as claimed in claim 4, wherein the strands are in the form of a roving.

* * * * *